(12) United States Patent
Vigholm et al.

(10) Patent No.: US 11,459,732 B2
(45) Date of Patent: Oct. 4, 2022

(54) HYDRAULIC SYSTEM FOR A WORKING MACHINE

(71) Applicant: Volvo Constructrion Equipment AB, Eskilstuna (SE)

(72) Inventors: Bo Vigholm, Stora Sundby (SE); Johan Hallman, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 17/288,098

(22) PCT Filed: Oct. 24, 2018

(86) PCT No.: PCT/EP2018/079177
§ 371 (c)(1),
(2) Date: Apr. 23, 2021

(87) PCT Pub. No.: WO2020/083482
PCT Pub. Date: Apr. 30, 2020

(65) Prior Publication Data
US 2021/0381200 A1 Dec. 9, 2021

(51) Int. Cl.
*E02F 9/22* (2006.01)
*F15B 21/0423* (2019.01)
(Continued)

(52) U.S. Cl.
CPC .......... *E02F 9/2292* (2013.01); *E02F 9/0841* (2013.01); *E02F 9/225* (2013.01);
(Continued)

(58) Field of Classification Search
CPC ............ F15B 21/0423; F15B 2211/212; F15B 21/14; F15B 2211/20576; F15B 2211/20515; E02F 9/2292; E02F 9/2217
(Continued)

(56) References Cited

U.S. PATENT DOCUMENTS

2013/0152573 A1 6/2013 Tsuruga et al.
2015/0075150 A1* 3/2015 Stammen ............ F16H 61/4104
60/428
(Continued)

FOREIGN PATENT DOCUMENTS

CN 102418354 A 4/2012
DE 10343016 A1 5/2005
(Continued)

OTHER PUBLICATIONS

International Search Report and Written Opinion of the International Searching Authority, PCT/EP2018/079177, dated Jul. 5, 2019, 13 pages.

*Primary Examiner* — Thomas E Lazo
*Assistant Examiner* — Daniel S Collins
(74) *Attorney, Agent, or Firm* — Sage Patent Group (57) ABSTRACT

A hydraulic system includes a first electric machine connected to a first hydraulic machine and a second electric machine connected to a second hydraulic machine. An output side of the second hydraulic machine is connected to an input side of the first hydraulic machine. A hydraulic consumer is hydraulically coupled to an output side of the first hydraulic machine via a supply line and is powered by the first hydraulic machine. A return line hydraulically couples the hydraulic consumer to an input side of the first hydraulic machine. The second hydraulic machine provides a flow of hydraulic fluid to the input side of the first hydraulic machine if a requested flow from the first hydraulic machine exceeds a flow of the return line and recuperates energy if the requested flow from the first hydraulic machine is lower than the flow of the return line.

16 Claims, 9 Drawing Sheets

(51) Int. Cl.
*E02F 9/08* (2006.01)
*F15B 21/041* (2019.01)
*F15B 21/14* (2006.01)

(52) U.S. Cl.
CPC ............ *E02F 9/226* (2013.01); *E02F 9/2217* (2013.01); *E02F 9/2242* (2013.01); *F15B 21/041* (2013.01); *F15B 21/0423* (2019.01); *F15B 21/14* (2013.01); *F15B 2211/20576* (2013.01); *F15B 2211/212* (2013.01)

(58) Field of Classification Search
USPC .................................................. 417/245, 250
See application file for complete search history.

(56) References Cited

U.S. PATENT DOCUMENTS

| | | |
|---|---|---|
| 2015/0192149 A1 | 7/2015 | Ma et al. |
| 2015/0361996 A1 | 12/2015 | Yuan et al. |
| 2016/0333903 A1* | 11/2016 | Peterson et al. ........ F15B 21/14 60/427 |

FOREIGN PATENT DOCUMENTS

| | | |
|---|---|---|
| DE | 102016217541 A1 | 3/2018 |
| EP | 2824334 A1 | 1/2015 |
| WO | 2012030495 A2 | 3/2012 |
| WO | 2012055579 A9 | 12/2013 |

\* cited by examiner

HYDRAULIC SYSTEM FOR A WORKING MACHINE

CROSS REFERENCE TO RELATED APPLICATIONS

This application is a 35 U.S.C. § 371 national stage application of PCT International Application No. PCT/EP2018/079177 filed on Oct. 24, 2018, the disclosure and content of which is incorporated by reference herein in its entirety.

TECHNICAL FIELD

The invention relates to a hydraulic system for a working machine. In particular, the system relates to a hybrid drive system comprising an internal combustion engine and a plurality of electrical machines.

The invention is applicable on working machines within the fields of industrial construction machines or construction equipment, in particular wheel loaders. Although the invention will be described with respect to a wheel loader, the invention is not restricted to this particular machine, but may also be used in other working machines such as articulated haulers, excavators and backhoe loaders.

BACKGROUND

In connection with transportation of heavy loads, e.g. in construction work, work machines are frequently used. A work machine may be operated with large and heavy loads in areas where there are no roads, for example for transports in connection with road or tunnel building, sand pits, mines and similar environments.

Work machines commonly employ a hydraulic system for providing power to functions such as steering and lifting. The hydraulic system may for example be powered by the internal combustion engine via a power take-off connected to an output shaft of the engine.

To improve the fuel efficiency of the working machine, a hybrid hydraulic system can be used. One interesting approach is to provide a hydraulic hybrid system comprising an electrical machine for providing power to the hydraulic system. By combining the electric machine with an energy storage, energy can be recuperated and stored during certain operations to be used when required.

A typical wheel loader operation includes simultaneous operation with the two main subsystems of the motion system—driveline and work hydraulics. Since both systems are directly coupled to the engine shaft the interaction of the systems can be problematic. Accordingly, it is desirable to further improve the efficiency of a hybrid hydraulic system.

SUMMARY

An object of the invention is to provide an improved electric hybrid hydraulic system for a working machine.

According to a first aspect of the invention, there is provided a hydraulic system for a working machine. The system comprising: a first electric machine connected to a first hydraulic machine; a second electric machine connected to a second hydraulic machine, an output side of the second hydraulic machine being connected to an input side of the first hydraulic machine; at least one hydraulic consumer hydraulically coupled to an output side of the first hydraulic machine via a supply line and configured to be powered by the first hydraulic machine; a first return line hydraulically coupling the hydraulic consumer to an input side of the first hydraulic machine; wherein the second hydraulic machine is configured to provide a flow of hydraulic fluid from a hydraulic fluid supply to the input side of the first hydraulic machine if a requested flow from the first hydraulic machine exceeds a flow of the first return line and to recuperate energy if the requested flow from the first hydraulic machine is lower than the flow of the first return line.

That the first electric machine is connected to the first hydraulic machine means that an output shaft of the electric machine is mechanically connected to an input shaft of the hydraulic machine such that the electric machine may operate as either a motor providing power to the hydraulic machine or as a generator generating power received from the hydraulic machine. The same applies for the second electric machine and the second hydraulic machine. It can further be assumed that the first and second electrical machines are connected to an electrical power supply and/or energy storage.

The present invention is based on the realization that the described hydraulic system can be used to efficiently and flexibly recuperate energy using the second hydraulic machine if a return flow from a hydraulic consumer exceeds a requested hydraulic flow. Moreover, the described system offers flexibility in that it is also capable of providing an additional hydraulic flow from the second hydraulic machine to the hydraulic consumer if required, i.e. if the first hydraulic machine is not capable of providing the requested flow or if it is more energy efficient to use the second hydraulic machine. A further advantage of the described system is that it offers redundancy in the hydraulic system, meaning that if one of the first and second electric or hydraulic machines should malfunction, the hydraulic system can still be operated, even if it may be at reduced capacity. This may help an operator to finish a task in a safe manner and to reach a service location without the need for additional assistance or on-site repairs. Furthermore, additional electrical and hydraulic machines may be arranged in parallel to the described first and second electrical and hydraulic machines to further extend the functionality and flexibility of the described system. Moreover, by using a system with two units of electrical and hydraulic machines in parallel, it is possible to arrange the system such that the different hydraulic machines supply power to different consumers, thereby making it possible to reduce losses when multiple consumers are operated simultaneously. By using two hydraulic machines it may also be possible to use smaller machines compared to if only one would be used, thereby providing an advantage in terms of system installation and integration.

According to one embodiment of the invention, the first hydraulic machine may be configured to recuperate energy if a requested pressure from the first hydraulic machine is lower than a pressure in the first return line. Thereby, also the first hydraulic machine can be used for energy recuperation by providing power the first electric machine which will then function as a generator.

According to one embodiment of the invention, the hydraulic system may further comprise first pressure detection means arranged to determine a pressure in the supply line. The pressure of the supply line may for example be determined by arranging a pressure sensor in the supply line. However, it is also possible to determine the pressure based on the properties and operating conditions of the first hydraulic machine. For example, assuming that the torque from the electric machine is known, the pressure from the hydraulic machine can be calculated based on the known displacement and known losses of the hydraulic machine.

According to one embodiment of the invention, the hydraulic system may also comprise second pressure detection means arranged to determine a pressure in the first return line. By knowing the pressure in the first return line and/or in the supply line, the first and second hydraulic machines can be controlled to operate as required. In principle, the first and second hydraulic machine may be controlled independently of each other, where the second hydraulic machine is controlled to achieve optimized energy recuperation for the hydraulic consumers and where the first hydraulic machine is controlled to provide the pressure required for operating the consumers. However, the second hydraulic machine is preferably further controlled to provide a minimum pressure required for the first hydraulic machine to operate at high rpm. The first hydraulic machine is thus dependent on the pressure in the first return line and from the second hydraulic machine, since the pressure determined the maximum rpm possible for the first hydraulic machine.

According to one embodiment of the invention, the hydraulic system may further comprise a check valve arranged between the input side of the first hydraulic machine and the hydraulic fluid supply, and between the output side of the second hydraulic machine and the hydraulic fluid supply, wherein the check valve is configured to allow the first hydraulic machine to access hydraulic fluid from the hydraulic fluid supply. Thereby, the first hydraulic machine may draw hydraulic fluid directly from the supply if the flow of hydraulic fluid from the second hydraulic machine is not sufficiently large to satisfy a flow requested from the first hydraulic machine. The check valve is arranged to prevent hydraulic fluid from flowing from the second hydraulic machine to the hydraulic fluid supply.

According to one embodiment of the invention, the hydraulic system may further comprise a reconditioning system connected to the hydraulic fluid supply and a reconditioning valve arranged between the first return line and the reconditioning system, the valve being configured to control a flow of hydraulic fluid from the first return line to the reconditioning system. The reconditioning system provides the option to recondition the hydraulic fluid if needed, and the reconditioning valve may for example be an on/off valve.

According to one embodiment of the invention, the reconditioning system may comprise a hydraulic fluid cooler and/or a hydraulic fluid filter, thereby the hydraulic fluid can be controllably cooled, heated and/or filtrated by controlling the flow to the reconditioning system.

According to one embodiment of the invention the hydraulic system may further comprise a first temperature sensor configured to determine the temperature of hydraulic fluid in the hydraulic fluid supply.

According to one embodiment of the invention the hydraulic system may further comprise a second temperature sensor arranged in the first return line to determine a temperature of hydraulic fluid in the first return line. By arranging temperature sensors in both the first return line and in the hydraulic fluid supply, which may be a tank, the total thermal energy of the hydraulic fluid can be determined. Accordingly, a more efficient cooling strategy can be employed since the hydraulic fluid cooler can be controlled to be used when the temperature of hydraulic fluid in the system is higher than the temperature of hydraulic fluid in the tank. However, the hydraulic fluid from the hydraulic system can be cooled by the hydraulic fluid cooler regardless of the temperature of the hydraulic fluid in the tank.

According to one embodiment of the invention, the hydraulic system may advantageously comprise a hydraulic accumulator connected to the return line. Thereby, excess energy can be stored to be used later. The hydraulic accumulator may for example be charged if the pressure of the return line is higher than the gas pre-charged pressure of the hydraulic accumulator and if the flow requested from the first hydraulic machine is lower than the flow of the return line. Moreover, energy stored in the accumulator can be used if the pressure of the hydraulic fluid in the accumulator is higher than the pressure of the return line. Moreover, the accumulator can be employed to provide a smoother operation of the hydraulic system where the accumulator can be used in situations where the second hydraulic machine is not capable of changing a supplied pressure sufficiently fast, i.e. the occurrence of pressure oscillations can be reduced.

According to one embodiment of the invention, the at least one hydraulic consumer may comprise a first hydraulic cylinder connected to the first return line and a second hydraulic cylinder having a second return line directly connected to the input side of the first hydraulic machine and to the output side of the second hydraulic machine, and wherein the first return line from a first side of the first hydraulic cylinder is connected to the hydraulic fluid supply via a pressure limiter and to the input side of the first hydraulic machine and to the output side of the second hydraulic machine via a check valve allowing a flow from the first return line to the second return line, wherein the pressure limiter is configured to allow a flow from the first return line to the hydraulic fluid supply if the pressure in the first return line is lower than the pressure in the second return line, and if the pressure of the first return line is higher then a threshold pressure of the pressure limiter.

According to one embodiment of the invention, the pressure limiter may be connected to the input side of the second hydraulic machine and to the hydraulic fluid supply via a check valve arrangement comprising a first check valve allowing the second hydraulic machine to access hydraulic fluid from the hydraulic fluid supply and a second check valve allowing a flow from the pressure limiter to the hydraulic fluid supply. Thereby, the second hydraulic machine may access hydraulic fluid both from the hydraulic fluid supply and from the return line via the pressure limiter. This means that the second hydraulic machine is capable of providing a higher flow to the first hydraulic machine if required.

According to one embodiment of the invention, the pressure limiter may be connected to the hydraulic fluid supply via the second check valve and further via the reconditioning system.

According to one embodiment of the invention the hydraulic system may further comprise a return valve block connected to a first side of the second hydraulic cylinder, the return valve block comprising a first return check valve arranged to allow a flow from the first side of the second hydraulic cylinder to the second return line and a first control valve controlling the flow from the first side of the second hydraulic cylinder to a second pressure limiter arranged between the first side of the second hydraulic cylinder and the input side of the second hydraulic machine. By means of the return valve block, the return flow of hydraulic fluid from the second hydraulic cylinder can be controlled such that the flow is either provided to the input side of the first hydraulic machine or to the input side of the second hydraulic machine.

According to one embodiment of the invention, the hydraulic system may further comprise a third hydraulic cylinder having a first side connected to the return valve block, wherein the return valve block further comprises a second return check valve arranged to allow a flow from the first side of the third hydraulic cylinder to the second return line and a second control valve controlling a flow from the first side of the third hydraulic cylinder to the second pressure limiter. Thereby, also the return flow from the third hydraulic cylinder can be controlled in the same manner as described above for the return flow from the second hydraulic cylinder.

According to one embodiment of the invention, the first hydraulic cylinder may be a steering cylinder, the second hydraulic cylinder may be a lift cylinder and the third hydraulic cylinder may be a tilt cylinder of a working machine. Thereby, the described hydraulic system can be used in a working machine such as a wheel loader, and the advantages of the hydraulic system results in more efficient operation of the working machine. There is also provided a working machine comprising a hydraulic system according to any one of the aforementioned embodiments.

Further effects and features of this second aspect of the present invention are largely analogous to those described above in connection with the first aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the present detailed description, various embodiments of a hydraulic system according to the present invention are mainly discussed with reference to a hydraulic hybrid system in a wheel loader, where the hydraulic consumers are illustrated as hydraulic cylinders. It should however be noted that this by no means limits the scope of the present invention since the described hydraulic system is equally applicable in other application and for other types of working machines.

Figure 1:
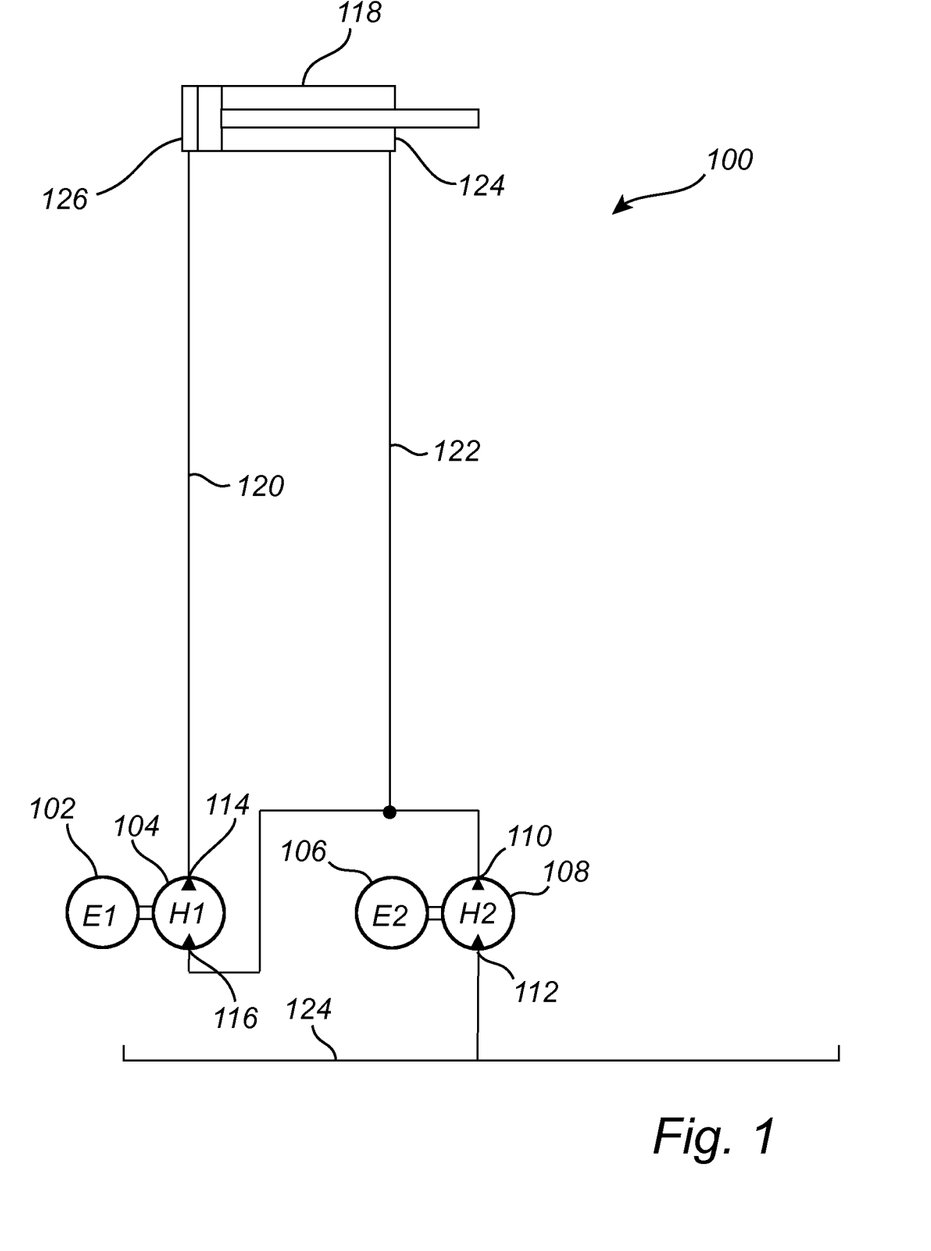
FIG. 1 is a schematic illustration of a hydraulic system according to an embodiment of the invention.

FIG. 1 schematically illustrates a hydraulic system 100 for a working machine. The hydraulic system 100 comprises a first electric machine 102 connected to a first hydraulic machine 104 and a second electric machine 106 connected to a second hydraulic machine 108, wherein an output side 110 of the second hydraulic machine 108 is connected to an input side 116 of the first hydraulic machine 104. The first and second hydraulic machines 104, 108 are here illustrated as fixed displacement hydraulic machines. However, it is equally possible to operate the described system with variable displacement hydraulic machines. If variable displacement hydraulic machines are used, it is further needed to provide control signals to the hydraulic machines to control the pressure provided.

The hydraulic system 100 further comprises at least one hydraulic consumer 118 hydraulically coupled to an output side 114 of the first hydraulic machine 104 via a supply line 120 and configured to be powered by the first hydraulic machine 104. The hydraulic consumer 118 is here represented by a hydraulic cylinder 118 having a piston side 126 connected to the output side 114 of the first hydraulic machine 104 and a piston rod side 124 which is connected to a first return line 122 hydraulically coupling the hydraulic consumer 118 to an input side 116 of the first hydraulic machine 104.

In the described hydraulic system, the second hydraulic machine 108 is configured to provide a flow of hydraulic fluid from a hydraulic fluid supply 124 to the input side 116 of the first hydraulic machine 104 if a requested flow from the first hydraulic machine 104 exceeds a flow of the first return line 122. The second hydraulic machine 108 is further configured to recuperate energy if the requested flow from the first hydraulic machine 104 is lower than the flow of the first return line 122. The requested flow from the first hydraulic machine 104 may based on a requested function from a vehicle operator, such as turning the wheel loader, lifting a load, or any other operation requiring hydraulic power. The request is translated into a flow from the first hydraulic machine 104 and if there is a flow available in the first return line 122, the flow can be used by the first hydraulic machine 104. In another scenario, if there is a flow in the first return line 122 but not a corresponding need for the flow, the flow can be directed through the second hydraulic machine 108 which powers the second electric machine 106 to act as a generator. The generated energy may for example be stored in an electrical energy storage or used for other functions of the working machine.

The hydraulic fluid supply 124 is here illustrated as a hydraulic tank 124. However, it is also possible to provide hydraulic fluid from a low pressure return flow as discussed herein, from a feeder pump or from an accumulator as will be illustrated in the following.

The first hydraulic machine 104 is further configured to recuperate energy if a requested pressure from the first hydraulic machine 104 is lower than a pressure in the first return line 122.

Figure 2:
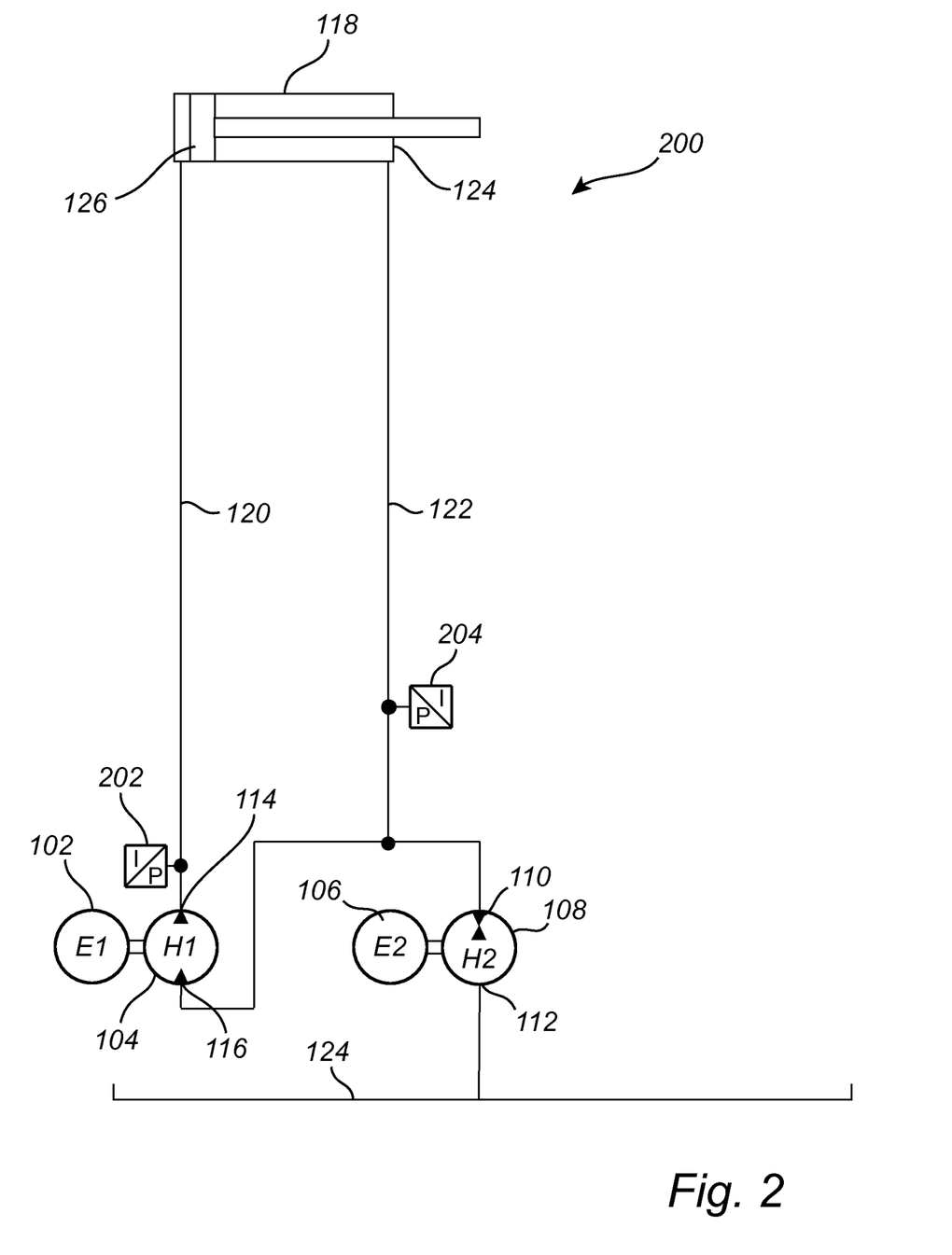
FIG. 2 is a schematic illustration of a hydraulic system according to an embodiment of the invention.

In FIG. 2, it is illustrated that the hydraulic system 200 comprises first pressure detection means 202 arranged to determine a pressure in the supply line 120 and second pressure detection means 204 arranged to determine a pressure in the first return line 122. The first and second pressure detection means 202, 204 may for example be pressure sensors arranged in the supply line 120 and first return line 122, respectively.

Figure 3:
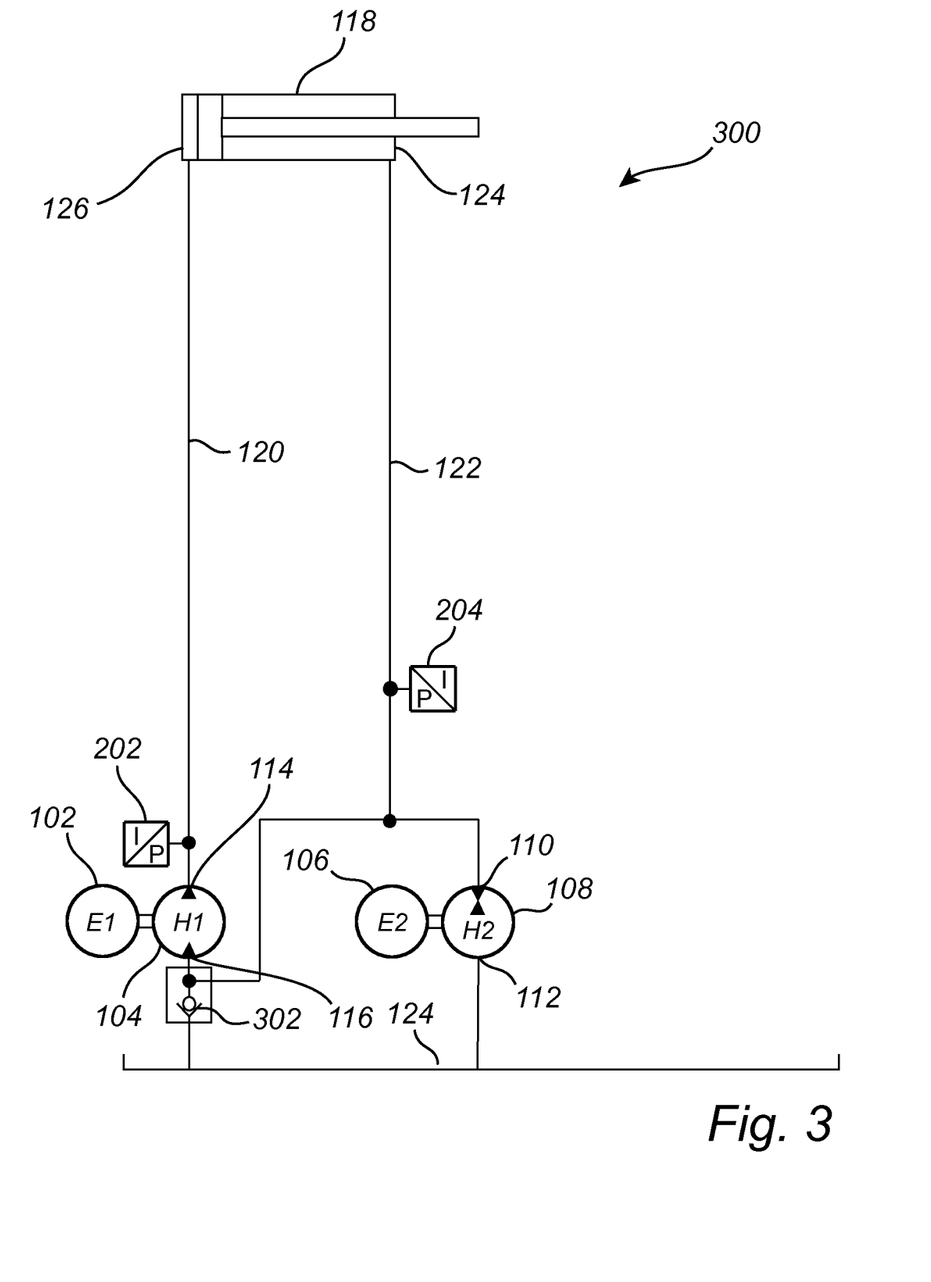
FIG. 3 is a schematic illustration of a hydraulic system according to an embodiment of the invention.

FIG. 3 schematically illustrates a hydraulic system 300 further comprising a check valve 302 arranged between the input side 116 of the first hydraulic machine 104 and the hydraulic fluid supply 124, and between the output side 110 of the second hydraulic machine 108 and the hydraulic fluid supply 124, wherein the check valve 302 is configured to allow the first hydraulic machine 104 to access hydraulic fluid from the hydraulic fluid supply 124. As illustrated in FIG. 3, the check valve 302 is arranged to prevent hydraulic fluid from flowing from the input side 116 of first hydraulic machine 104, and also from the first return line 122 and the output side 110 of the second hydraulic machine 108, to the hydraulic fluid supply 124.

Figure 4:
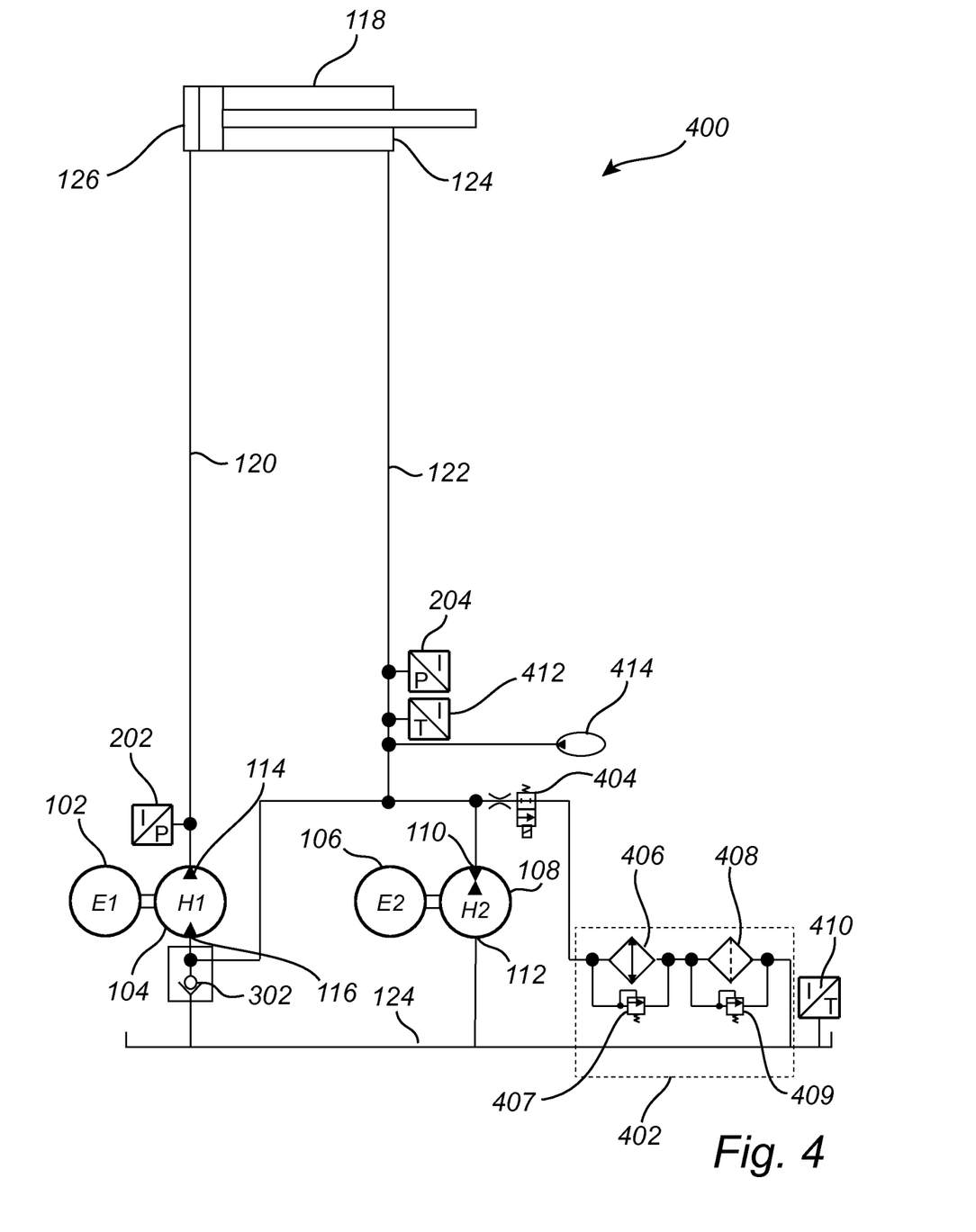
FIG. 4 is a schematic illustration of a hydraulic system according to an embodiment of the invention.

FIG. 4 schematically illustrates a hydraulic system 400 further comprising a reconditioning system 402 connected to the hydraulic fluid supply 124 and a reconditioning valve 404 arranged between the first return line 122 and the reconditioning system 402. The reconditioning valve 404 is configured to control a flow of hydraulic fluid from the first return line 122 to the reconditioning system 402. The reconditioning valve 404 is here illustrated as an on/off valve, but is also possible to use other types of valves. The illustrated reconditioning system comprises a hydraulic fluid cooler 406 and a hydraulic fluid filter 408. Each of the hydraulic fluid cooler 406 and a hydraulic fluid filter 408 is arranged in parallel with a corresponding pressure limiter 407, 409 to ensure that the pressure to the hydraulic fluid cooler 406 and a hydraulic fluid filter 408 is not too high.

Moreover, the hydraulic system 400 illustrated in FIG. 4 comprises a first temperature sensor 410 configured to determine the temperature of hydraulic fluid in the hydraulic fluid supply 124 and a second temperature sensor 412 arranged in the first return line to determine a temperature of hydraulic fluid in the first return line 122. The temperature sensors can be connected to a control functionality which in turn regulates the reconditioning valve 404 to control the flow of hydraulic fluid to e.g. the hydraulic fluid cooler 406 based on the temperature of the hydraulic fluid at the respective positions. In general, the aim is to cool the hydraulic if the temperature is higher than a predetermined temperature. Cooling is preferably performed in operating phases which create as low power losses as possible. However if the temperature is too high, cooling must be done also in other phases that create higher power losses. Moreover, filtration of the hydraulic fluid is preferably related to the power consumption of the hydraulic system, since the hydraulic fluid will become more contaminated at higher power consumption. The hydraulic system 400 of FIG. 4 further comprises a hydraulic accumulator 414 connected to the first return line 122.

Figure 5:
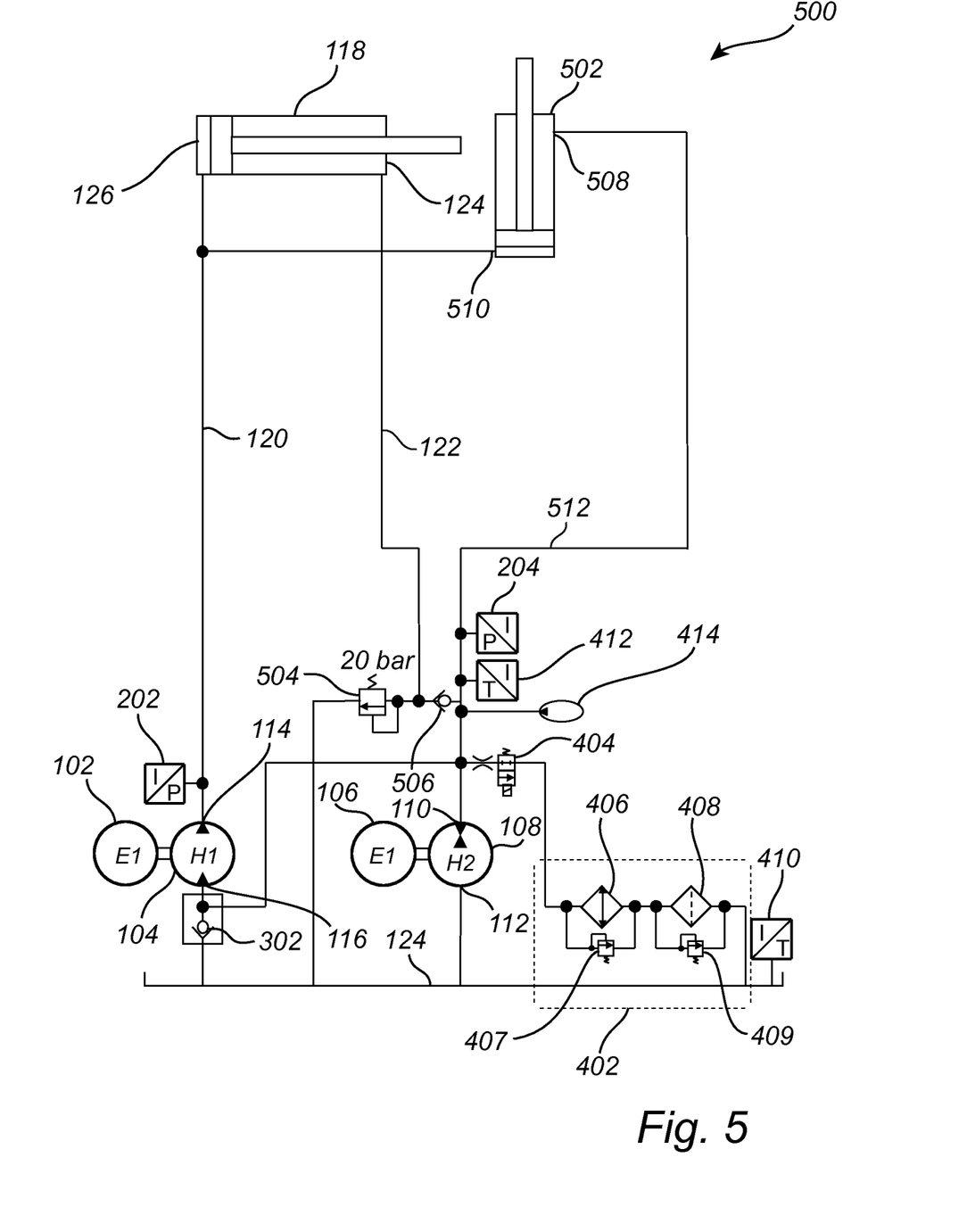
FIG. 5 is a schematic illustration of a hydraulic system according to an embodiment of the invention.

FIG. 5 illustrates a hydraulic system 500 comprising the first hydraulic cylinder 118 connected to the first return line 122 and a second hydraulic cylinder 502 having a second return line 512 directly connected to the input side 116 of the first hydraulic machine 104 and to the output side 110 of the second hydraulic machine 108. The piston side 510 of the second hydraulic cylinder 502 is connected to the supply line 120 and the piston rod side 508 is connected to the second return line 512.

The first return line 122 is further connected from the piston side 124 of the first hydraulic cylinder 118 to the tank 124 via a pressure limiter 504 and to the input side 116 of the first hydraulic machine 104 and the output side 110 of the second hydraulic machine 108 via a check valve 506. The check valve 506 is arranged to allow a flow from the first return line 122 to the second return line 512, assuming that the pressure in the first return line 122 is higher than the pressure of the second return line 512. If the pressure in the second return line 512 is higher than the pressure of the first return line 122, the check valve 506 prevents a flow from the second return line 512 to the first return line 122.

Furthermore, the pressure limiter 504 illustrated in FIG. 5 allows a flow from the second return 512 line to the tank 124 if the pressure in the first return line 122 is higher than the pressure in the second return line 512. The pressure in the first return line 122 must also be higher than the pressure level set by the pressure limiter 504 to produce a flow through the pressure limiter 504. The pressure limiter provides a counter pressure for the first hydraulic cylinder which is desirable in applications where a hydraulic cylinder needs a counter pressure to operate correctly. For example, if the first hydraulic cylinder 118 is a steering cylinder in a wheel loader, a counter pressure of approximately 20 bar may be desirable in order to provide the desirable steering function.

Figure 6:
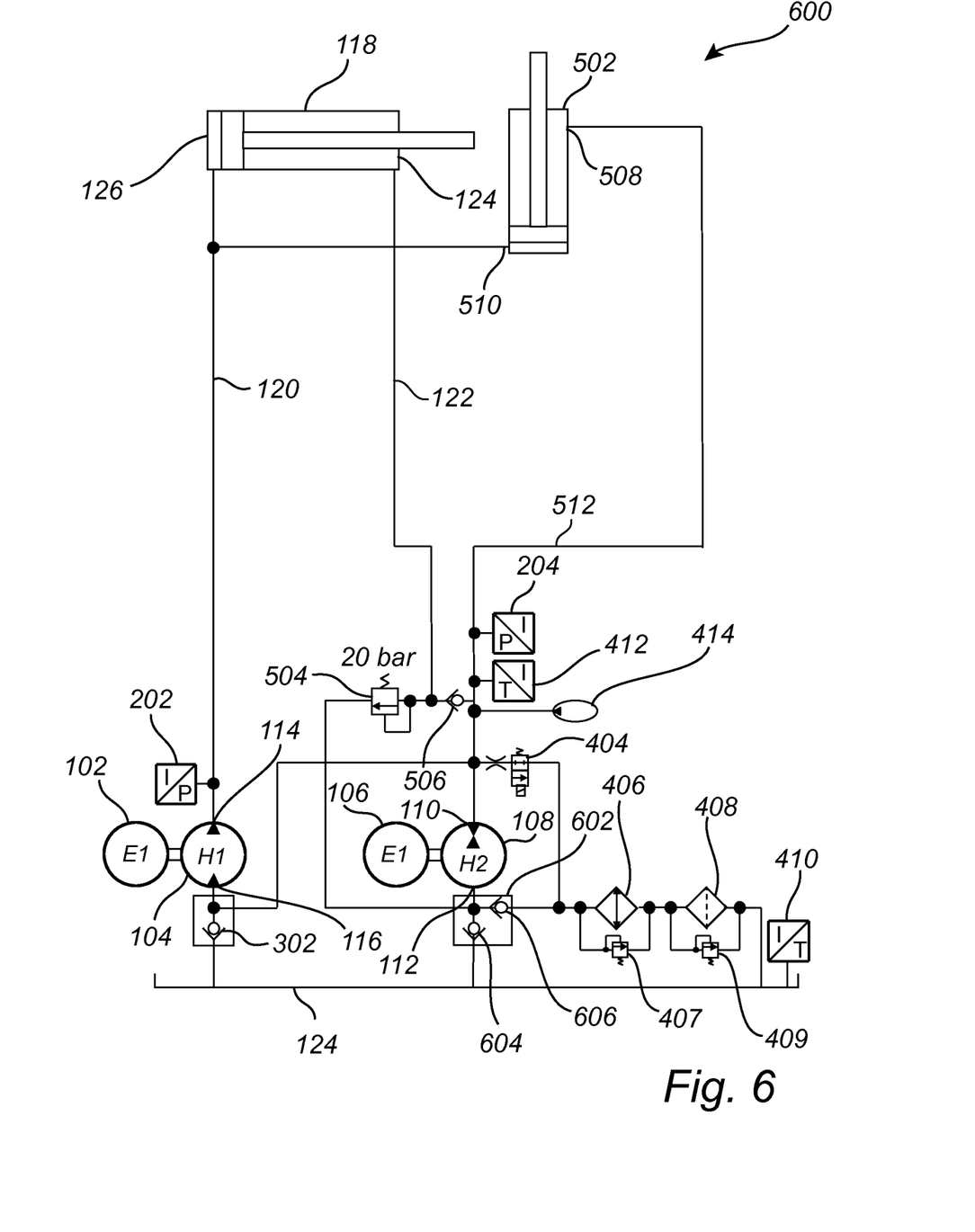
FIG. 6 is a schematic illustration of a hydraulic system according to an embodiment of the invention.

FIG. 6 illustrates a hydraulic system 600 where the pressure limiter 504 is connected to the input side 112 of the second hydraulic machine 108 and to the tank 124 via a check valve arrangement 602 comprising a first check valve 604 allowing the second hydraulic machine 108 to access hydraulic fluid from the tank 124 and a second check valve 606 allowing a flow of hydraulic fluid from the pressure limiter 504 to the tank 124. Moreover, the pressure limiter 504 is connected to the tank via the second check valve 606 and further via the reconditioning system 402. Thereby, a flow through the pressure limiter 504 can be used by the second hydraulic machine 108 or it can be provided to the reconditioning block 402 via the second check valve.

Figure 7:
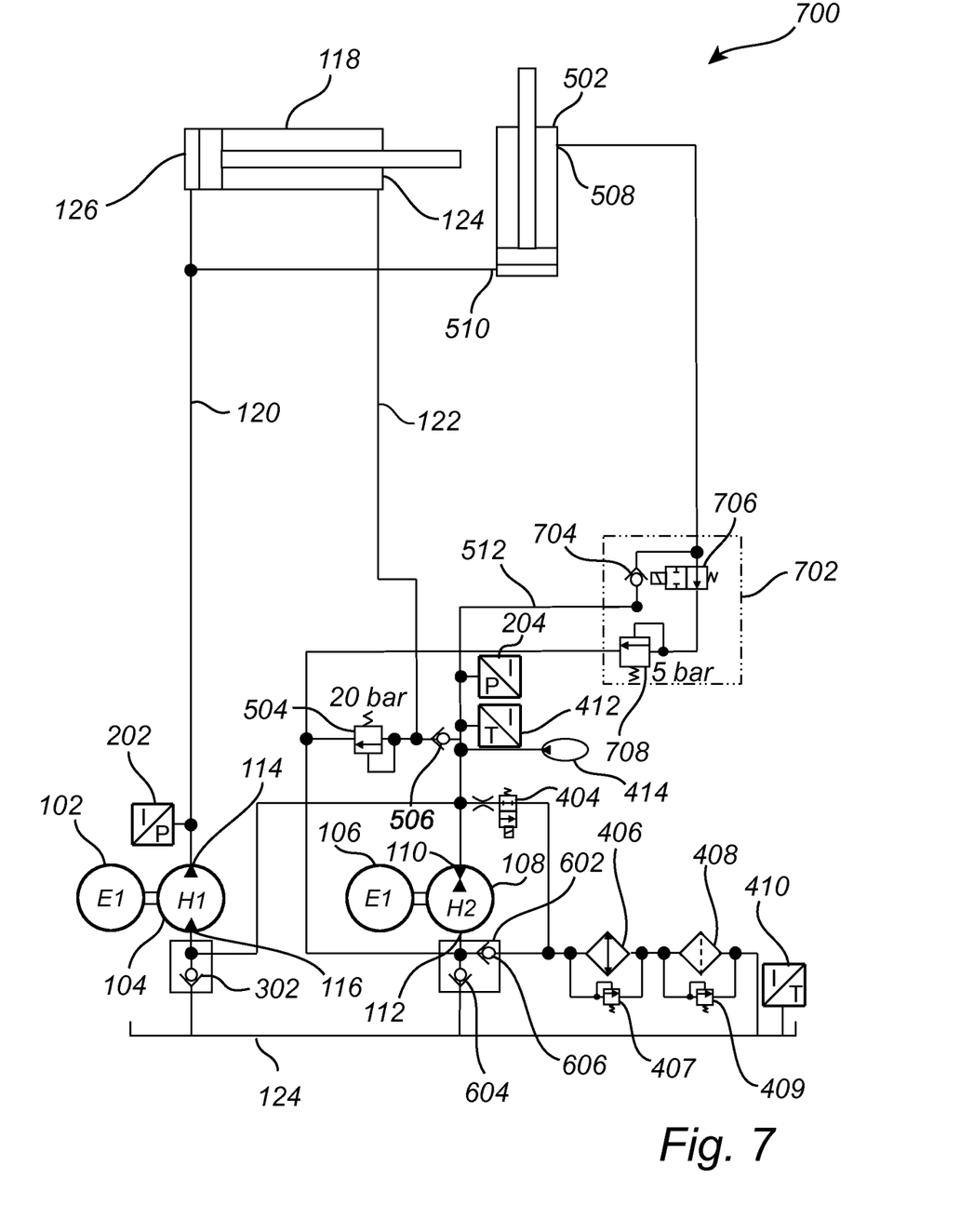
FIG. 7 is a schematic illustration of a hydraulic system according to an embodiment of the invention.

FIG. 7 illustrates a hydraulic system 700 further comprising a return valve block 702 connected to the piston rod side 508 of the second hydraulic cylinder 502. The return valve block 702 comprises a first return check valve 704 arranged to allow a flow from the piston rod side 508 of the second hydraulic cylinder 502 to the second return line 512 and a first control valve 706 controlling the flow from the piston rod side 508 of the second hydraulic cylinder 502 to a second pressure limiter 708 arranged between the piston rod side 508 of the second hydraulic cylinder 502 and the input side 112 of the second hydraulic machine 108.

Figure 8:
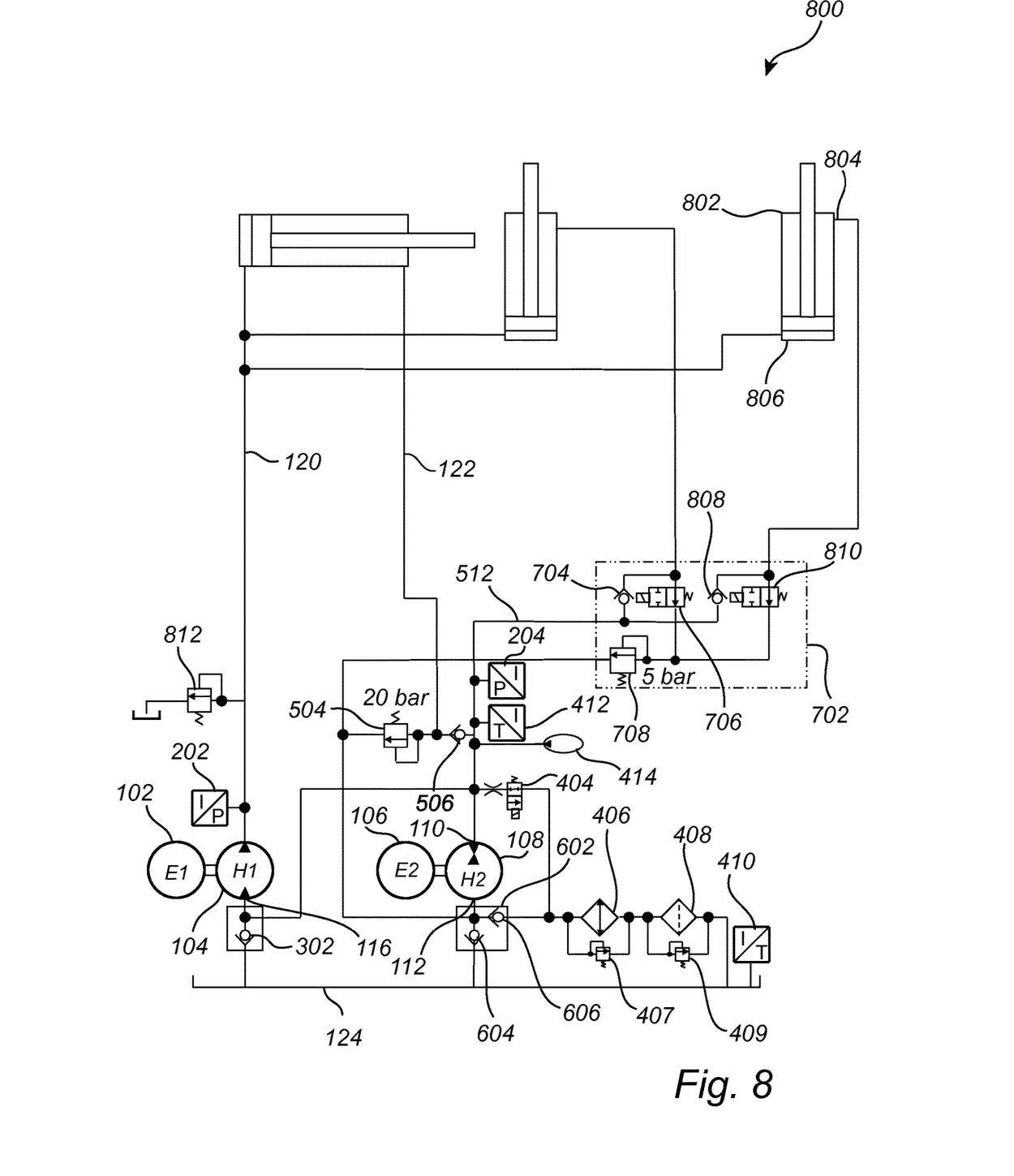
FIG. 8 is a schematic illustration of a hydraulic system according to an embodiment of the invention.

FIG. 8 illustrates a hydraulic system 800 further comprising a third hydraulic cylinder 802 having a piston rod side 804 connected to the return valve block 702. The return valve block 702 of FIG. 8 further comprises a second return check valve 808 arranged to allow a flow from the piston rod side 804 of the third hydraulic cylinder 802 to the second return line 512 and a second control valve 810 controlling a flow from the piston rod side 804 of the third hydraulic cylinder 802 to the second pressure limiter 708. The first hydraulic cylinder 118 may be a steering cylinder, the second hydraulic cylinder 502 may be a lift cylinder and the third hydraulic cylinder 802 may be a tilt cylinder of a working machine.

The return valve block 702 can be controlled so that the return flow to the tank 124 has a certain pressure determined by the pressure limiter 708, such as 5 bar. If the flow is instead controlled to go to the output side 110 of the second hydraulic machine 108 the pressure will be set by the second hydraulic machine 108. If the return flow is going to the tank 124 and if the second hydraulic machine 108 cannot supply enough flow, then the return oil from the second and third hydraulic cylinders 502, 802 will supply the first return line 122 with flow, i.e. the output side 110 of the second hydraulic machine 108, when the pressure falls down to 5 bar. The second hydraulic machine 108 may also access the tank 124 to provide a flow but the overall flow may thus be increased if also the flow from the first return line 122 is used.

An advantage of the described return valve block 702 is that is can easily be extended with additional valves to accommodate for additional hydraulic consumers.

Various embodiments of the described system may also comprise a pressure relief valve 812 on the supply line 120. The purpose of the pressure relief valve 812 is to prevent too high pressure spikes for example when a hydraulic cylinder hits a stop and the first hydraulic machine is unable to reduce the speed (flow) sufficiently fast.

It should also be noted that the orientation of one or more of the illustrated hydraulic cylinders 118, 502, 802 may be reversed, i.e. such that the piston rod side of the hydraulic cylinder is connected to the supply line 120.

Figure 9:
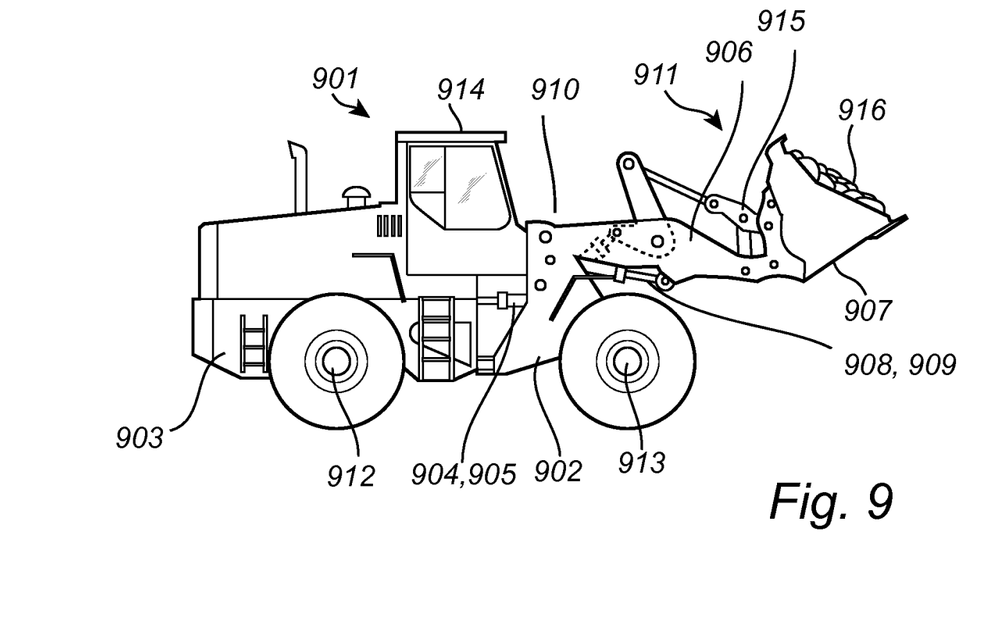
FIG. 9 is a schematic illustration of a working machine comprising a hydraulic system according to an embodiment of the invention.

FIG. 9 shows a frame-steered working machine in the form of a wheel loader 901. The body of the wheel loader 901 comprises a front body section 902 and a rear body section 903, which sections each has an axle 912, 913 for driving a pair of wheels. The rear body-section 903 comprises a cab 914. The body sections 902, 903 are connected to each other in such a way that they can pivot in relation to each other around a vertical axis by means of two first actuators in the form of hydraulic cylinders 904, 905 arranged between the two sections. The hydraulic cylinders 904, 905 are thus arranged one on each side of a horizontal centerline of the vehicle in a vehicle traveling direction in order to turn the wheel loader 901.

The wheel loader 901 comprises an equipment 911 for handling objects or material. The equipment 911 comprises a load-arm unit 906, also referred to as a linkage, and an implement 907 in the form of a bucket fitted on the load-arm unit 906. A first end of the load-arm unit 906 is pivotally connected to the front vehicle section 902. The implement 907 is pivotally connected to a second end of the load-arm unit 906.

The load-arm unit 906 can be raised and lowered relative to the front section 902 of the vehicle by means of two second actuators in the form of two hydraulic cylinders 908, 909, each of which is connected at one end to the front vehicle section 902 and at the other end to the load-arm unit 906. The bucket 907 can be tilted relative to the load-arm unit 906 by means of a third actuator in the form of a hydraulic cylinder 910, which is connected at one end to the front vehicle section 902 and at the other end to the bucket 907 via a link-arm system 915.

It is to be understood that the present invention is not limited to the embodiments described above and illustrated in the drawings; rather, the skilled person will recognize that many changes and modifications may be made within the scope of the appended claims.

The invention claimed is:

1. A hydraulic system for a working machine, the system comprising:
   a first electric machine connected to a first hydraulic machine;
   a second electric machine connected to a second hydraulic machine, an output side of the second hydraulic machine being connected to an input side of the first hydraulic machine;
   at least one hydraulic consumer hydraulically coupled to an output side of the first hydraulic machine via a supply line and configured to be powered by the first hydraulic machine;
   a first return line hydraulically coupling the hydraulic consumer to an input side of the first hydraulic machine; and
   a reconditioning system connected to the hydraulic fluid supply and a reconditioning valve arranged between the first return line and the reconditioning system, the reconditioning valve being configured to control a flow of hydraulic fluid from the first return line to the reconditioning system;
   wherein the second hydraulic machine is configured to provide a flow of hydraulic fluid from a hydraulic fluid supply to the input side of the first hydraulic machine if a requested flow from the first hydraulic machine exceeds a flow of the first return line and to recuperate energy if the requested flow from the first hydraulic machine is lower than the flow of the first return line; and
   wherein the at least one hydraulic consumer comprises a first hydraulic cylinder connected to the first return line and a second hydraulic cylinder having a second return line directly connected to the input side of the first hydraulic machine and to the output side of the second hydraulic machine, the first return line being connected from a first side of the first hydraulic cylinder to the hydraulic fluid supply via a pressure limiter and to the input side of the first hydraulic machine and to the output side of the second hydraulic machine via a check valve allowing a flow from the first return line to the second return line, the pressure limiter being configured to allow a flow from the first return line to the hydraulic fluid supply if the pressure in the first return line is lower than the pressure in the second return line, and if the pressure of the first return line is higher than a threshold pressure of the pressure limiter.

2. The hydraulic system according to claim 1, wherein the first hydraulic machine is configured to recuperate energy if a requested pressure from the first hydraulic machine is lower than a pressure in the first return line.

3. The hydraulic system according to claim 1, further comprising first pressure detection means arranged to determine a pressure in the supply line.

4. The hydraulic system according to claim 1, further comprising second pressure detection means arranged to determine a pressure in the first return line.

5. The hydraulic system according to claim 1, further comprising a check valve arranged between the input side of the first hydraulic machine and the hydraulic fluid supply, and between the output side of the second hydraulic machine and the hydraulic fluid supply, wherein the check valve is configured to allow the first hydraulic machine to access hydraulic fluid from the hydraulic fluid supply.

6. The hydraulic system according to claim 1, wherein the reconditioning system comprises a hydraulic fluid cooler.

7. The hydraulic system according to claim 1, wherein the reconditioning system comprises a hydraulic fluid filter.

8. A hydraulic system for a working machine, comprising:
   a first electric machine connected to a first hydraulic machine;
   a second electric machine connected to a second hydraulic machine, an output side of the second hydraulic machine being connected to an input side of the first hydraulic machine;
   at least one hydraulic consumer hydraulically coupled to an output side of the first hydraulic machine via a supply line and configured to be powered by the first hydraulic machine;
   a first return line hydraulically coupling the hydraulic consumer to an input side of the first hydraulic machine, wherein the second hydraulic machine is configured to provide a flow of hydraulic fluid from a hydraulic fluid supply to the input side of the first hydraulic machine if a requested flow from the first hydraulic machine exceeds a flow of the first return line and to recuperate energy if the requested flow from the first hydraulic machine is lower than the flow of the first return line; and a first temperature sensor configured to determine the temperature of hydraulic fluid in the hydraulic fluid supply.

9. A hydraulic system for a working machine, comprising:
a first electric machine connected to a first hydraulic machine;
a second electric machine connected to a second hydraulic machine, an output side of the second hydraulic machine being connected to an input side of the first hydraulic machine;
at least one hydraulic consumer hydraulically coupled to an output side of the first hydraulic machine via a supply line and configured to be powered by the first hydraulic machine;
a first return line hydraulically coupling the hydraulic consumer to an input side of the first hydraulic machine, wherein the second hydraulic machine is configured to provide a flow of hydraulic fluid from a hydraulic fluid supply to the input side of the first hydraulic machine if a requested flow from the first hydraulic machine exceeds a flow of the first return line and to recuperate energy if the requested flow from the first hydraulic machine is lower than the flow of the first return line; and
a second temperature sensor arranged in the first return line to determine a temperature of hydraulic fluid in the first return line.

10. The hydraulic system according to claim 1, further comprising a hydraulic accumulator connected to the return line.

11. The hydraulic system according to claim 1, wherein the pressure limiter is connected to the input side of the second hydraulic machine and to the hydraulic fluid supply via a check valve arrangement comprising a first check valve allowing the second hydraulic machine to access hydraulic fluid from the hydraulic fluid supply and a second check valve allowing a flow of hydraulic fluid from the pressure limiter to the hydraulic fluid supply.

12. The hydraulic system according to claim 11, wherein the pressure limiter is connected to the hydraulic fluid supply via the second check valve and further via the reconditioning system.

13. The hydraulic system according to claim 1, further comprising a return valve block connected to a first side of the second hydraulic cylinder, the return valve block comprising a first return check valve arranged to allow a flow from the first side of the second hydraulic cylinder to the second return line and a first control valve controlling the flow from the first side of the second hydraulic cylinder to a second pressure limiter arranged between the first side of the second hydraulic cylinder and the input side of the second hydraulic machine.

14. The hydraulic system according to claim 13, further comprising a third hydraulic cylinder having a first side connected to the return valve block, wherein the return valve block further comprises a second return check valve arranged to allow a flow from the first side of the third hydraulic cylinder to the second return line and a second control valve controlling a flow from the first side of the third hydraulic cylinder to the second pressure limiter.

15. The hydraulic system according to claim 1, wherein the first hydraulic cylinder is a steering cylinder, the second hydraulic cylinder is a lift cylinder and the third hydraulic cylinder is a tilt cylinder of a working machine.

16. A working machine comprising a hydraulic system according to claim 1.

* * * * *